United States Patent
Uchino et al.

(10) Patent No.: US 9,504,024 B2
(45) Date of Patent: Nov. 22, 2016

(54) MOBILE COMMUNICATION METHOD, RADIO BASE STATION, AND MOBILE STATION

(71) Applicant: NTT DOCOMO, INC., Tokyo (JP)

(72) Inventors: Tooru Uchino, Tokyo (JP); Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/425,644

(22) PCT Filed: Aug. 9, 2013

(86) PCT No.: PCT/JP2013/071609
§ 371 (c)(1),
(2) Date: Mar. 4, 2015

(87) PCT Pub. No.: WO2014/038349
PCT Pub. Date: Mar. 13, 2014

(65) Prior Publication Data
US 2015/0230235 A1    Aug. 13, 2015

(30) Foreign Application Priority Data
Sep. 5, 2012 (JP) ................................. 2012-195289

(51) Int. Cl.
*H04W 88/08* (2009.01)
*H04W 72/12* (2009.01)
(Continued)

(52) U.S. Cl.
CPC ......... *H04W 72/0413* (2013.01); *H04W 28/14* (2013.01); *H04W 72/0453* (2013.01);
(Continued)

(58) Field of Classification Search
CPC ... H04L 5/001; H04L 5/0035; H04L 5/0037; H04W 48/20; H04W 88/08; H04W 72/1284; H04W 72/0413; H04W 72/0453; H04W 72/1278; H04W 92/20; H04W 28/14
See application file for complete search history.

(56) References Cited

U.S. PATENT DOCUMENTS 8,208,416 B2 * 6/2012 Suzuki et al. ................ 370/310
9,241,301 B2 * 1/2016 Sawada et al. ............... 370/310
(Continued)

FOREIGN PATENT DOCUMENTS

| EP | 2230875 A2 | 9/2010 |
|----|------------|--------|
| EP | 2775773 A1 | 9/2014 |
| WO | 2012/108046 A1 | 8/2012 |

OTHER PUBLICATIONS

International Search Report issued in PCT/JP2013/071609 mailed on Oct. 15, 2013 (3 pages).
(Continued)

*Primary Examiner* — Ayaz Sheikh
*Assistant Examiner* — Debebe Asefa
(74) *Attorney, Agent, or Firm* — Osha Liang LLP (57) ABSTRACT

Occurrence of a delay in transmission of uplink data in "Inter-site CA" is avoided. A mobile communication method according to the present invention includes the steps of: causing a mobile station UE to transmit an SR to a radio base station eNB#1 by using a PUCCH-SR; causing the radio base station eNB#1 to notify the mobile station UE of a "UL grant"; causing the mobile station UE to transmit a BSR in a bearer #B/LCH#B to the radio base station eNB#1 by using a PUSCH designated in the "UL grant"; causing the radio base station eNB#1 to notify a radio base station eNB#10 of an amount of buffered data in the bearer #B/LCH#B; and causing the radio base station eNB#10 to assign the mobile station UE a resource for transmission of uplink data upon receipt of the amount of buffered data.

6 Claims, 9 Drawing Sheets

(51) Int. Cl.
*H04L 5/00* (2006.01)
*H04W 72/04* (2009.01)
*H04W 28/14* (2009.01)
*H04W 92/20* (2009.01)
*H04W 74/08* (2009.01)

(52) U.S. Cl.
CPC ..... *H04W72/1278* (2013.01); *H04W 74/0833* (2013.01); *H04L 5/001* (2013.01); *H04W 72/1284* (2013.01); *H04W 88/08* (2013.01); *H04W 92/20* (2013.01)

(56) References Cited

U.S. PATENT DOCUMENTS

| | | | |
|---|---|---|---|
| 9,271,290 B2* | 2/2016 | Pelletier et al. | 370/310 |
| 2012/0218966 A1 | 8/2012 | Yamazaki et al. | |
| 2013/0322339 A1 | 12/2013 | Ohta et al. | |

OTHER PUBLICATIONS

Written Opinion of the International Searching Authority issued in PCT/JP2013/071609 mailed on Oct. 15, 2013 (3 pages).

Alcatel-Lucent Shanghai Bell et al.; "BSR reporting in Carrier Aggregation"; 3GPP TSG-RAN WG2 Meeting #70, R2-103277; Montreal, Canada; May 10-14, 2010 (4 pages).

NTT Docomo; "On the need for additional carrier types in Rel-11 CA"; 3GPP TSG RAN WG1 #66bis, R1-113289; Zhuhai, China; Oct. 10-14, 2011 (4 pages).

NTT Docomo, Inc.; "Requirements, Candidate Solutions & Technology Roadmap for LTE Rel-12 Onward"; 3GPP Workshop on release 12 and onwards, RWS-120010; Ljubljana, Slovenia; Jun. 11-12, 2012 (27 pages).

3GPP TS 36.300 V11.2.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Jun. 2012 (201 pages).

3GPP TS 36.321 V10.5.0; "3rd Generation Partnership Project; Technical Specification Group Radio Access Network; Evolved Universal Terrestrial Radio Access (E-UTRA); Medium Access Control (MAC) protocol specification (Release 10)"; Mar. 2012 (54 pages).

Extended European Search Report issued in the counterpart European Patent Application No. 13835553.2, mailed Mar. 21, 2016 (11 pages).

* cited by examiner

MOBILE COMMUNICATION METHOD, RADIO BASE STATION, AND MOBILE STATION

TECHNICAL FIELD

The present invention relates to a mobile communication method, a radio base station, and a mobile station.

BACKGROUND ART

In LTE (Long Term Evolution) Release-10, CA (Carrier Aggregation) was introduced to realize wide-band communication beyond 20 MHz (for example, communication at 100 Hz). In CA, communication is performed by using bundled CCs (Component Carriers) under same radio base station eNB as illustrated in FIG. 6(a).

Figure 6:
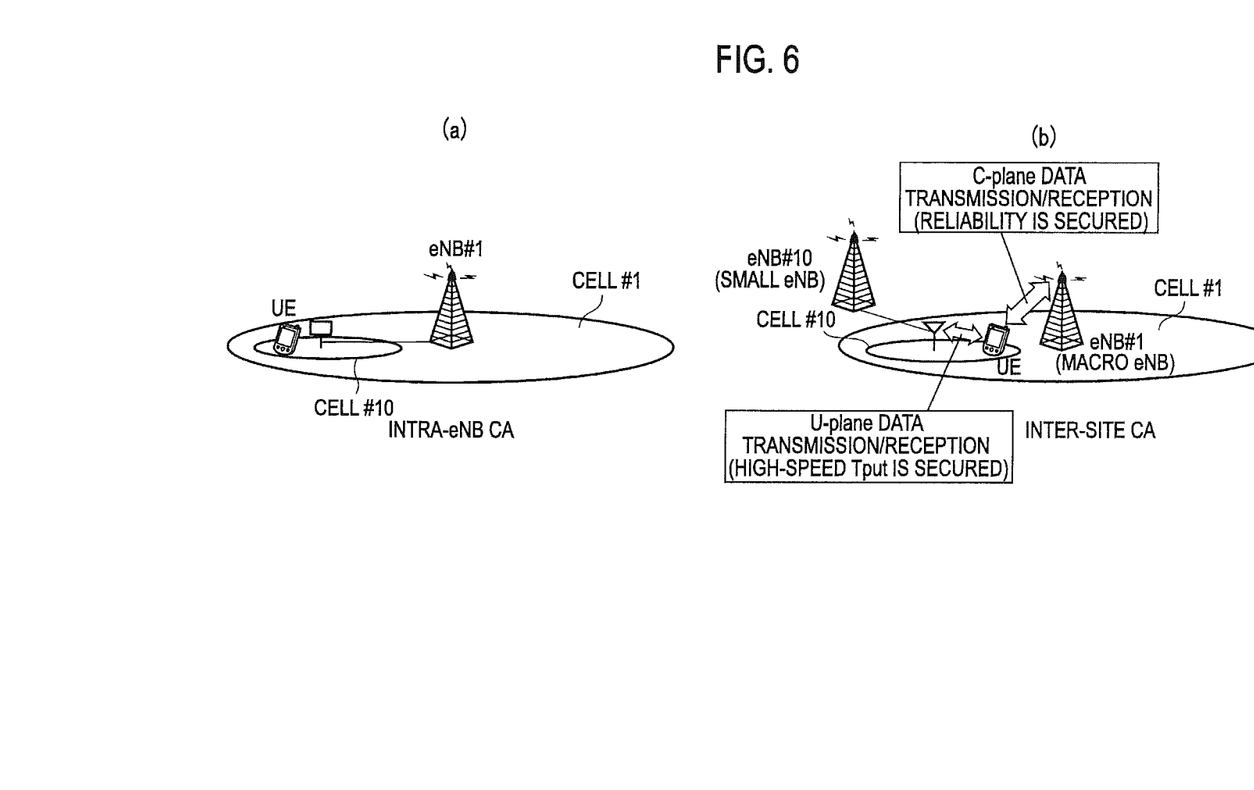
FIG. 6 is a diagram for describing a conventional technique.

Afterwards, in LTE Release-12 and beyond, "Small Cell enhancement" was proposed, and "Inter-site CA" in which communication is performed by using bundled CCs (cells) under different radio base stations eNB has been studied for introduction as a more flexible network architecture than conventional ones (see FIG. 6(b)).

For example, as illustrated in FIG. 6(b), in a conceivable operation using "Inter-site CA" in which communication for a C-plane data requiring reliability is performed in a cell #1 (a macro cell) under a radio base station eNB#1 (a macro eNB) via a SRB (Signaling Radio Bearer), while communication for a U-plane data requiring wide-band communication is performed in a cell #10 (a small cell) under a radio base station eNB#10 (a small eNB) via a DRB (Data Radio Bearer).

Figure 7:
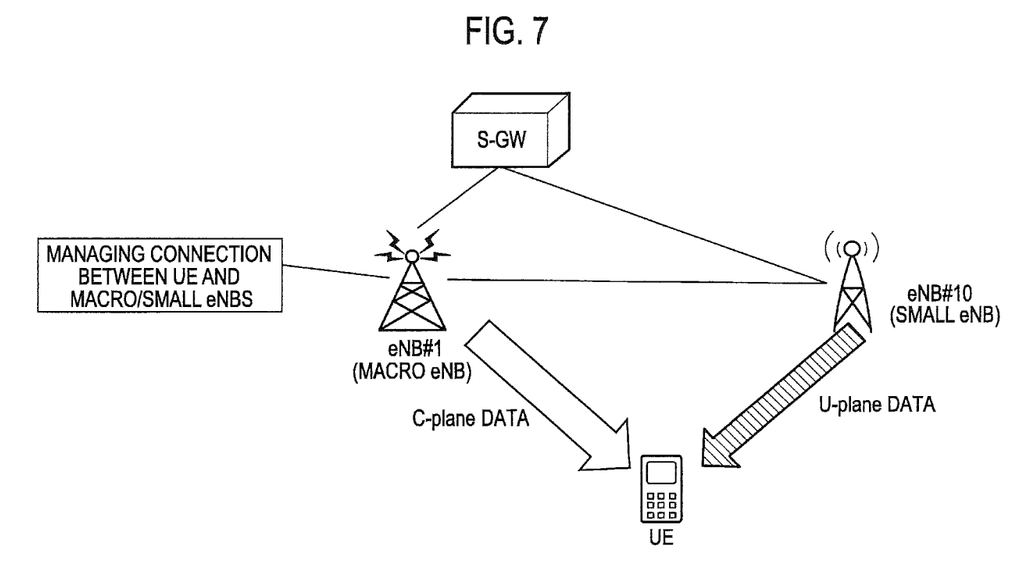
FIG. 7 is a diagram for describing the conventional technique.

In the case where the communication for the C-plane data is performed in the cell #1 under the radio base station eNB#1 via the SRB, and the communication for the U-plane data is performed in the cell #10 under the radio base station eNB#10 via the DRB as described above, the radio base station eNB#1 is expected to basically handle connections and settings between a mobile station UE and the radio base station eNB#1/the radio base station eNB#10, as illustrated in FIG. 7.

In this case, basically, it is expected that the cell #1 (the macro cell) is set as a reliable Pcell (Primary Cell), and the cell #10 is set as a supplementary Scell (Secondary Cell).

In this case, the radio base stations eNB#1 and #10 are expected to independently perform scheduling processing for the mobile station UE by using schedulers.

Figure 8:
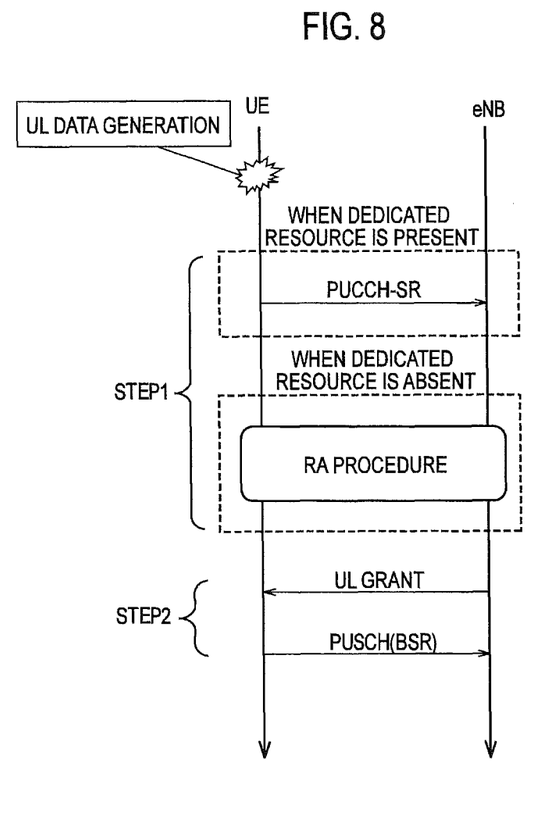
FIG. 8 is a diagram for describing the conventional technique.

Here, according to the LTE specifications, the mobile station UE is expected to transmit a scheduling request to the radio base station eNB, as illustrated in FIG. 8, when uplink data to be transmitted is generated.

As illustrated in FIG. 8, when a "PUCCH (Physical Uplink Control Channel)-SR resource" that is a dedicated SR (Scheduling Request) transmission resource is assigned to the mobile station UE, the mobile station UE transmits an SR to the radio base station eNB by using the PUCCH-SR, in STEP 1.

On the other hand, the mobile station UE starts a RA (Random Access) procedure in STEP 1, when the PUCCH-SR is not assigned to the mobile station UE.

In STEP 2, the mobile station UE transmits a BSR (Buffer Status Report) to the radio base station eNB by using a PUSCH (Physical Uplink Shared Channel) corresponding to a "UL grant" assigned to the above-described SR.

Here, when the RA procedure is performed in STEP 1, the "UL grant" is designated by a "RA response" transmitted in the RA procedure.

Figure 9:
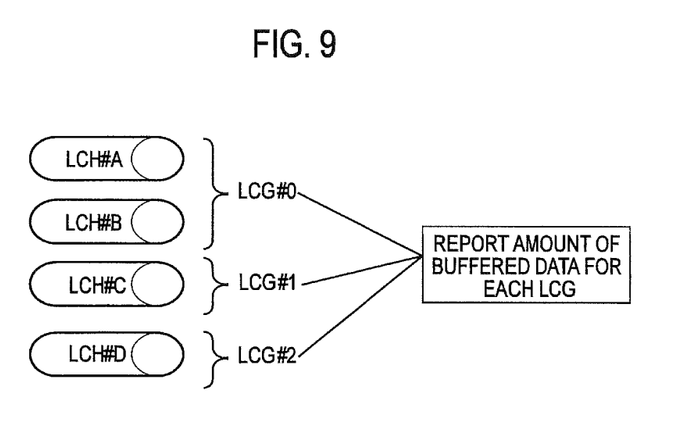
FIG. 9 is a diagram for describing the conventional technique.

Note that the BSR is configured to calculate and then report an amount of buffered data in each LCH (Logical Channel) for every LCG (Logical Channel Group) in which uplink data is present, as illustrated in FIG. 9.

PRIOR ART DOCUMENT

Non-Patent Document

Non-patent document 1: 3GPP 36.300
Non-patent document 2: 3GPP 36.321

SUMMARY OF THE PRESENT INVENTION

In "Inter-site CA" according to the existing LTE, the mobile station UE is to report a BSR in a cell in which the mobile station UE receives a "UL grant" when the BSR is triggered, even if a scheduler is independently installed in each radio base station eNB.

Figure 10:
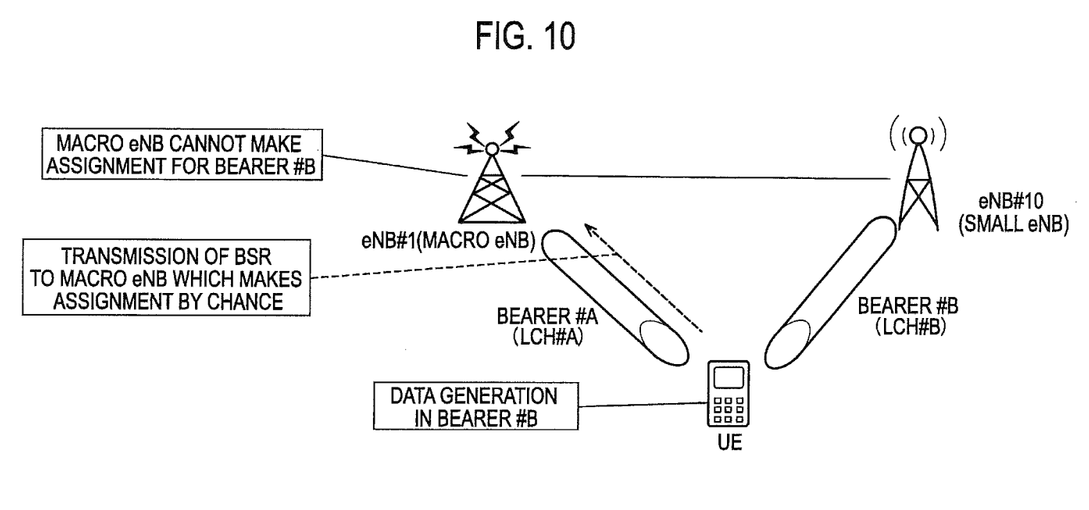
FIG. 10 is a diagram for describing the conventional technique.

For instance, in an example of FIG. 10, when uplink data to be transmitted in a bearer #B/LCH#B is generated, the mobile station UE transmits an SR and receives a "UL grant" via a bearer #A/LCH#A assigned a PUCCH-SR. Here, the LCH#A and the LCH#B are assumed to belong to the same LCG #1.

As a result, the mobile station UE transmits a BSR in the bearer #B/LCH#B to the radio base station eNB#1, via a radio resource of the radio base station eNB#1.

In the present specification, the description is provided assuming that "bearer" and "LCH" are synonymous.

Here, the radio base station eNB#1 does not establish the bearer #B/LCH#S with the mobile station UE, and accordingly cannot assign the mobile station UE a resource for transmission of the uplink data in the bearer #B/LCH#B even if the radio base station eNB#1 receives the BSR in the bearer #B/LCH#B.

In this case, until the BSR in the bearer #B/LCH#B arrives at the radio base station eNB#10 with which the bearer #B/LCH#B is established, the resource for transmission of the uplink data in the bearer #B/LCH#E is not assigned, which causes a problem of a delay in transmission of the uplink data.

Accordingly, the present invention is made in view of the above-described problem, and an objective of the present invention is to provide a mobile communication method, a radio base station, and a mobile station, which are capable of avoiding occurrence of a delay in transmission of uplink data when "Inter-site CA" is performed.

A first feature of the present invention is summarized as a mobile communication method in a mobile communication system in which a mobile station is configured to be capable of performing carrier aggregation via a first cell under a first radio base station and a second cell under a second radio base station, the mobile communication method including the steps of: when a first logical channel is established between the mobile station and the first radio base station, a second logical channel is established between the mobile station and the second radio base station, a scheduling request transmission resource is assigned to the mobile station by the first radio base station, and uplink data to be transmitted in the second logical channel is generated in the mobile station, causing the mobile station to transmit a scheduling request to the first radio base station by using the scheduling request transmission resource; causing the first radio base station to notify the mobile station of a buffered-data-amount transmission resource; causing the mobile station to transmit an amount of buffered data in the second logical channel to the first radio base station by using the buffered-data-amount transmission resource; causing the first radio base station to notify the second radio base station of the amount of buffered data in the second logical channel; and causing the second radio base station to assign the mobile station a resource for transmission of the uplink data, upon receipt of the amount of buffered data.

A second feature of the present invention is summarized as a mobile communication method in a mobile communication system in which a mobile station is configured to be capable of performing carrier aggregation via a first cell under a first radio base station and a second cell under a second radio base station, the mobile communication method including the steps of: when a first logical channel is established between the mobile station and the first radio base station, a second logical channel is established between the mobile station and the second radio base station, a scheduling request transmission resource is assigned to the mobile station by each of the first radio base station and the second radio base station, and uplink data to be transmitted in the second logical channel is generated in the mobile station, causing the mobile station to transmit a scheduling request to the second radio base station by using the scheduling request transmission resource assigned by the second radio base station, without transmitting the scheduling request to the first radio base station by using the scheduling request transmission resource assigned by the first radio base station; causing the second radio base station to notify the mobile station of a buffered-data-amount transmission resource; causing the mobile station to transmit an amount of buffered data in the second logical channel to the second radio base station by using the buffered-data-amount transmission resource; and causing the second radio base station to assign the mobile station a resource for transmission of the uplink data, upon receipt of the amount of buffered data.

A third feature of the present invention is summarized as a mobile communication method in a mobile communication system in which a mobile station is configured to be capable of performing carrier aggregation via a first cell under a first radio base station and a second cell under a second radio base station, the mobile communication method including the steps of: when a first logical channel is established between the mobile station and the first radio base station, a second logical channel is established between the mobile station and the second radio base station, a scheduling request transmission resource is assigned in the first radio base station, a scheduling request transmission resource is not assigned in the second radio base station, and uplink data to be transmitted in the second logical channel is generated in the mobile station, causing the mobile station to start a random access procedure with the second radio base station, without transmitting a scheduling request to the first radio base station by using the scheduling request transmission resource assigned by the first radio base station; causing the second radio base station to notify the mobile station of a buffered-data-amount transmission resource in the random access procedure; causing the mobile station to transmit an amount of buffered data in the second logical channel to the second radio base station by using the buffered-data-amount transmission resource; and causing the second radio base station to assign the mobile station a resource for transmission of the uplink data, upon receipt of the amount of buffered data.

A fourth feature of the present invention is summarized as a mobile communication method in a mobile communication system in which a mobile station is configured to be capable of performing carrier aggregation via a first cell under a first radio base station and a second cell under a second radio base station, the mobile communication method including the steps of: when a first logical channel is established between the mobile station and the first radio base station, a second logical channel is established between the mobile station and the second radio base station, a scheduling request transmission resource is assigned to the mobile station by the first radio base station, and uplink data to be transmitted in the second logical channel is generated in the mobile station, causing the mobile station to transmit an amount of buffered data in the second logical channel to the second radio base station by using a buffered-data-amount transmission resource notified by the second radio base station, even though the scheduling request transmission resource is assigned by the first radio base station; and causing the second radio base station to assign the mobile station a resource for transmission of the uplink data, upon receipt of the amount of buffered data.

A fifth feature of the present invention is summarized as a radio base station operable as a second radio base station in a mobile communication system in which a mobile station is configured to be capable of performing carrier aggregation via a first cell under a first radio base station and a second cell under the second radio base station, the radio base station including: a reception unit configured to, when a first logical channel is established between the mobile station and the first radio base station, a second logical channel is established between the mobile station and the second radio base station, a scheduling request transmission resource is assigned in the first logical channel, and uplink data to be transmitted in the second logical channel is generated in the mobile station, receive an amount of buffered data in the second logical channel from the first radio base station, after the mobile station transmits a scheduling request to the first radio base station by using the scheduling request transmission resource; and a transmission unit configured to notify the mobile station of a resource for transmission of the uplink data, in response to receipt of the amount of buffered data.

A sixth feature of the present invention is summarized as a mobile station configured to be capable of performing carrier aggregation via a first cell under a first radio base station and a second cell under a second radio base station. Here, the mobile station is configured to: even when a first logical channel is established with the first radio base station, a second logical channel is established with the second radio base station, a scheduling request transmission resource is assigned by the first radio base station, a scheduling request transmission resource is not assigned by the second radio base station, and uplink data to be transmitted in the second logical channel is generated, start a random access procedure with the second radio base station without transmitting a scheduling request to the first radio base station by using the scheduling request transmission resource; and transmit an amount of buffered data in the second logical channel to the second radio base station by using a buffered-data-amount transmission resource acquired from the second radio base station in the random access procedure.

A seventh feature of the present invention is summarized as a mobile station configured to be capable of performing carrier aggregation via a first cell under a first radio base station and a second cell under a second radio base station. Here, the mobile station is configured to: when a first logical channel is established with the first radio base station, a second logical channel is established with the second radio base station, a scheduling request transmission resource is assigned by each of the first radio base station and the second radio base station, and uplink data to be transmitted in the second logical channel is generated, transmit a scheduling request to the second radio base station by using the scheduling request transmission resource assigned by the second radio base station without transmitting a scheduling request to the first radio base station by using the scheduling request transmission resource assigned by the first radio base station; and transmit an amount of buffered data in the second logical channel to the second radio base station by using a buffered-data-amount transmission resource acquired from the second radio base station.

A eighth feature of the present invention is summarized as a mobile station configured to be capable of performing carrier aggregation via a first cell under a first radio base station and a second cell under a second radio base station. Here, the mobile station is configured to, when a first logical channel is established with the first radio base station, a second logical channel is established with the second radio base station, the second radio base station is associated with the second logical channel, and uplink data to be transmitted in the second logical channel is generated, transmit an amount of buffered data in the second logical channel to the second radio base station by using a buffered-data-amount transmission resource notified by the second radio base station even if a scheduling request transmission resource is assigned by the first radio base station.

A ninth feature of the present invention is summarized as a mobile station configured to be capable of performing carrier aggregation via a first cell under a first radio base station and a second cell under a second radio base station. Here, the mobile station is configured to: when a first logical channel is established with the first radio base station, a second logical channel is established with the second radio base station, the second radio base station is associated with the second logical channel, and uplink data to be transmitted in the second logical channel is generated, and even if a scheduling request transmission resource is assigned by the first radio base station, transmit a scheduling request to the second radio base station by using the scheduling request transmission resource assigned by the second radio base station without transmitting a scheduling request to the first radio base station by using the scheduling request transmission resource assigned by the first radio base station, or start a random access procedure; and when a resource is not assigned by the second radio base station for a predetermined period, transmit a scheduling request to the first radio base station by using the scheduling request transmission resource assigned by the first radio base station, or start a random access procedure.

A tenth feature of the present invention is summarized as a radio base station operable as a first radio base station in a mobile communication system in which a mobile station is configured to be capable of performing carrier aggregation via a first cell under the first radio base station and a second cell under a second radio base station. Here, the radio base station is configured to, when a first logical channel is established between the mobile station and the first radio base station, a second logical channel is established between the mobile station and the second radio base station, a scheduling request transmission resource is assigned to the mobile station by the first radio base station, and uplink data to be transmitted in the second logical channel is generated in the mobile station, notify the mobile station of a buffered-data-amount transmission resource after receiving a scheduling request from the mobile station by using the scheduling request transmission resource; and when receiving an amount of buffered data in the second logical channel from the mobile station by using the buffered-data-amount transmission resource, notify the second radio base station of the amount of buffered data.

DETAILED DESCRIPTION (Mobile Communication System according to First Embodiment of Present Invention)

A mobile communication system according to a first embodiment of the present invention is described with reference to FIG. 1 and FIG. 2.

Figure 1:
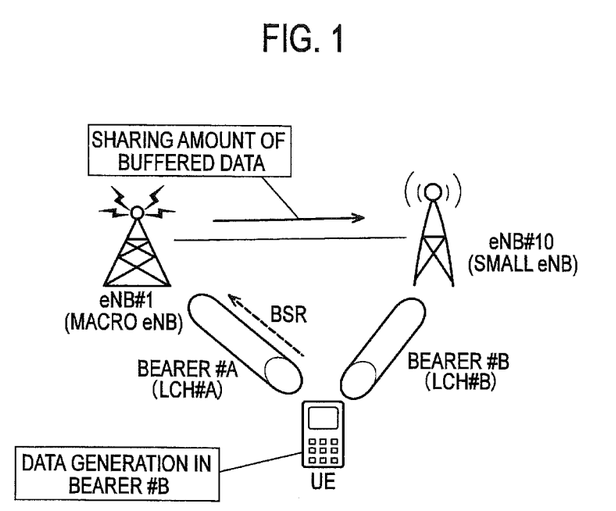
FIG. 1 is an overall configuration diagram of a mobile communication system according to a first embodiment of the present invention.

The mobile communication system according to the present embodiment employs LTE, and is configured as a system to which "Inter-site CA" is applicable, as illustrated in FIG. 1.

Further, the mobile communication system according to the present embodiment includes a radio base station eNB#10 (a small eNB) managing a cell #10, and a radio base station eNB#1 (a macro eNB) managing a cell #1.

Here, the cell #10 is a small cell (a phantom cell), and the cell #1 is a macro cell. Note that a coverage area of the cell #10 and a coverage area of the cell #1 are arranged to overlap each other at least partially.

In the mobile communication system according to the present embodiment, a bearer #A/LCH#A is established between a mobile station UE and the radio base station eNB#1 in the cell #1, and a bearer #B/LCH#B is established between the mobile station UE and the radio base station eNB#10 in the cell #10, as illustrated in FIG. 1.

Further, in the mobile communication system according to the present embodiment, a PUCCH-SR is assigned to the mobile station UE, in the cell under the radio base station eNB#1.

Figure 2:
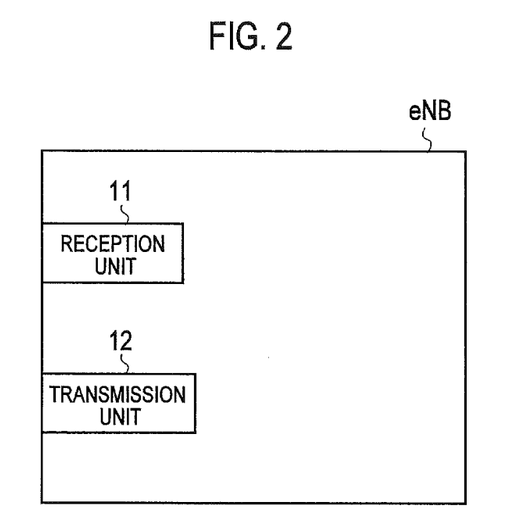
FIG. 2 is a functional block diagram of a radio base station according to the first embodiment of the present invention.

The radio base station according to the present embodiment includes a reception unit 11 and a transmission unit 12, as illustrated in FIG. 2.

The reception unit 11 of the radio base station eNB#1 is configured to receive various signals from the mobile station UE and the radio base station eNB#10. The transmission unit 12 of the radio base station eNB#1 is configured to transmit various signals to the mobile station UE and the radio base station eNB#10.

On the other hand, the reception unit 11 of the radio base station eNB#10 is configured to receive various signals from the mobile station UE and the radio base station eNB#1. The transmission unit 12 of the radio base station eNB#10 is configured to transmit various signals to the mobile station UE and the radio base station eNB#1.

Operation Example 1 of the mobile communication system according to the present embodiment is described below with reference to FIG. 1.

First, when uplink data to be transmitted in the bearer #B/LCH#B is generated, the mobile station UE transmits an SR to the radio base station eNB#1 by using the PUCCH-SR, since the PUCCH-SR is assigned thereto.

Second, upon receipt of the SR by the reception unit 11 of the radio base station eNB#1, the transmission unit 12 of the radio base station eNB#1 transmits a "UL grant" for assignment of a PUSCH by using a radio resource of the cell under the radio base station eNB#1, to the mobile station UE.

Third, the mobile station UE transmits a BSR reporting an amount of buffered data in the bearer #B/LCH#B, by using the PUSCH corresponding to the "UL grant".

Fourth, upon receipt of the BSR by the reception unit 11 of the radio base station eNB#1, the transmission unit 12 of the radio base station eNB#1 notifies the radio base station eNB#10 of the amount of buffered data in the bearer #B/LCH#B.

Fifth, upon receipt of the amount of buffered data by the reception unit 11 of the radio base station eNB#10, the transmission unit 12 of the radio base station eNB#10 notifies the mobile station UE of a resource for transmission of the uplink data of the bearer #B/LCH#B.

In this case, the BSR may be notified for every LCH/bearer, or maybe notified for every LCG, and "which radio base station is a destination" or "a UL grant in what cell is expected" may be notified.

Further, Operation Example 2 of the mobile communication system according to the present embodiment is described with reference to FIG. 1. Note that, in this Operation Example 2, a PUCCH-SR is assumed to be assigned by the radio base station eNB#10.

First, when uplink data to be transmitted in the bearer #B/LCH#B is generated, the mobile station UE starts a scheduling request transmission procedure, with the radio base station eNB#10. In this case, the mobile station UE does not perform transmission of a SR by using the PUCCH-SR to the radio base station eNB#1, even if a PUCCH-SR is assigned by the radio base station eNB#1 with which the bearer #A/LCH#A is established.

In other words, when the PUCCH-SR is assigned by the radio base station eNB#10 with which the bearer #B/LCH#B is established, the mobile station UE transmits an SR to the radio base station eNB#10 by using the PUCCH-SR, whereas if not, the mobile station UE starts an RA procedure for the radio base station eNB#10.

To be more specific, in this case, the mobile station UE reports the total amount of buffered data in each LCH for every LCG, only for the LCH associated with each of the radio base stations eNB#1 and #10.

In other words, even if there are LCHs belonging to the same LCG, as for the LCH associated with the radio base station to which the BSR is not to be reported, the amount of buffered data in this LCH is not reflected on the BSR.

Second, upon receipt of this SR by the reception unit 11 of the radio base station eNB#10, the transmission unit 12 of the radio base station eNB#10 transmits a "UL grant" for assignment of a PUSCH, by using a radio resource of the cell under of the radio base station eNB#10, to the mobile station UE.

Third, the mobile station UE transmits a BSR reporting an amount of buffered data in the bearer #B/LCH#B to the radio base station eNB#10, by using this PUSCH.

Fourth, upon receipt of the BSR by the reception unit 11 of the radio base station eNB#10, the transmission unit 12 of the radio base station eNB#10 notifies the mobile station UE of a resource for transmission of the uplink data of the bearer #B/LCH#B.

(Modification 1)

A mobile communication system according to Modification 1 of the present invention is described with reference to FIG. 3 to FIG. 5, focusing on a point different from the above-described mobile communication system according to the first embodiment.

Figure 3:
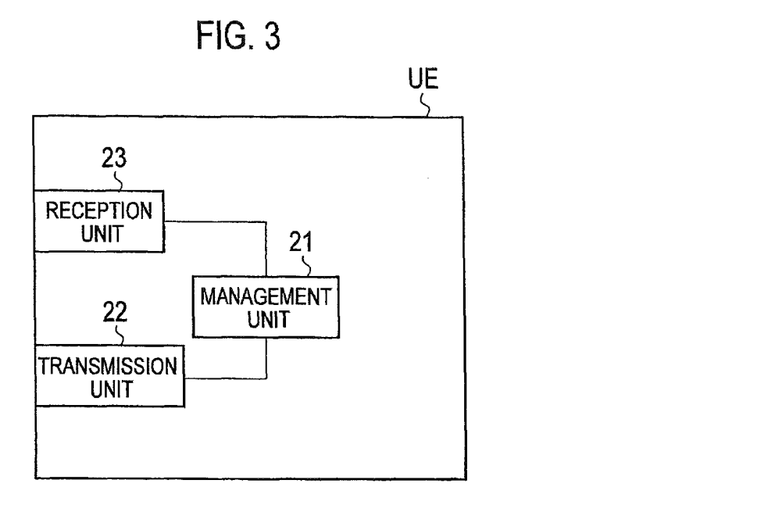
FIG. 3 is a functional block diagram of a mobile station according to Modification 1 of the present invention.
Figure 4:
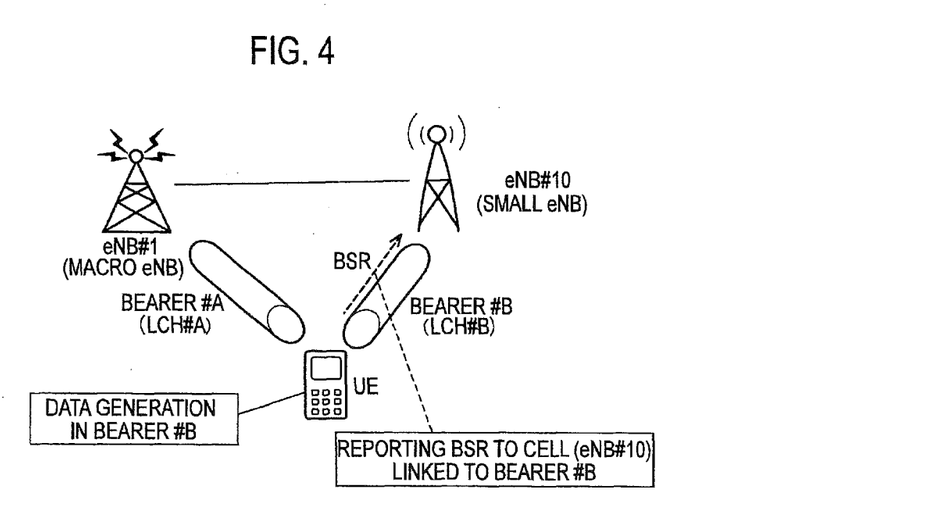
FIG. 4 is an overall configuration diagram of a mobile communication system according to Modification 1 the present invention.

The mobile station UE according to Modification 1 includes a management unit 21, a transmission unit 22, and a reception unit 23, as illustrated in FIG. 3.

The management unit 21 is configured to manage a relationship between a radio base station eNB (or a cell under a radio base station eNB) and a bearer/LCH.

In the mobile communication system according to Modification 1, the management unit 21 is configured to associate the radio base station eNB#1 (or the cell #1 under the radio base station eNB#1) with the bearer #A/LCH#A. Further, the management unit 21 is configured to associate the radio base station eNB#10 (or the cell #10 under the radio base station eNB#10) with the bearer #B/LCH#B.

The reception unit 23 is configured to receive various signals from the radio base station eNB#1/10, and the transmission unit 22 is configured to transmit various signals to the radio base station eNB#1/10.

An operation example of the mobile communication system according to the present embodiment is described below with reference to FIG. 4.

First, assume that a PUCCH-SR is not assigned by the radio base station eNB#10 associated with the bearer #B/LCH#B. When uplink data to be transmitted in the bearer #B/LCH#B is generated, the mobile station UE starts an RA procedure, with the radio base station eNB#10 associated with the bearer #B/LCH#B. In this case, even if a PUCCH-SR is assigned by the radio base station eNB#1 associated with the bearer #A/LCH#A, the mobile station UE does not perform transmission of a SR by using this PUCCH-SR to the radio base station eNB#1 not associated with the bearer #B/LCH#B.

Now, assume that a PUCCH-SR is assigned by the radio base station eNB#10 associated with the bearer #B/LCH#B. When uplink data to be transmitted in the bearer #B/LCH#B is generated, the mobile station UE transmits a SR to the radio base station eNB#10 associated with the bearer #B/LCH#B, by using the PUCCH-SR associated in the bearer #B/LCH#B. In this case, even if a PUCCH-SR is assigned by the radio base station eNB#1 associated with the bearer #A/LCH#A, the mobile station UE does not perform transmission of a SR by using this PUCCH-SR to the radio base station eNB#1 not associated with the bearer #B/LCH#B.

Second, upon receipt of a relevant BSR, the radio base station eNB#10 assigns the mobile station UE a resource for transmission of the uplink data.

Here, the reception unit 23 is configured to acquire information about the radio base station eNB#10 (the cell

10) associated with the bearer #B/LCH#B, by individual signaling, at the time of setting the bearer #B/LCH#B.

Further, assume that the reception unit 23 receives a "UL grant" in the radio base station eNB#10 (the cell #10) associated with the bearer #B/LCH#B. The transmission unit 22 is configured to transmit a BSR reporting an amount of buffered data in the bearer #B/LCH#B to the radio base station eNB#10, by using a PUSCH corresponding to the "UL grant", in such a case.

On the other hand, assume that the reception unit 23 receives a "UL grant" in a radio base station eNB/cell (e.g., the radio base station #1/cell #1) not associated with the bearer #B/LCH#B. The transmission unit 22 is configured not to transmit a BSR reporting an amount of buffered data in the bearer #B/LCH#B by using a PUSCH corresponding to this "UL grant", in such a case.

Note that the transmission unit 22 may be configured such that, if the reception unit 23 does not receive a "UL grant" from the radio base station eNB#10 associated with the bearer #B/LCH#B for a predetermined period, the transmission unit 22 retransmits a SR to the radio base station eNB#10.

Alternatively, the transmission unit 22 maybe configured as follows. If the reception unit 23 does not receive a "UL grant" from the radio base station eNB#10 associated with the bearer #B/LCH#B for a predetermined period, the transmission unit 22 transmits a SR to the radio base station eNB#1, or launches an RA procedure with the radio base station eNB#1.

Further, in the above-described case, when "Inter-site CA" is performed with radio base stations eNB, which radio base station eNB is given a higher priority for transmission of an SR (or which radio base station eNB is a counterpart for launching the RA procedure) may be determined beforehand. Furthermore, such a priority may be designated by a radio base station eNB.

Next, an operation example of the mobile station UE according to the present embodiment is described with reference to FIG. 5.

Figure 5:
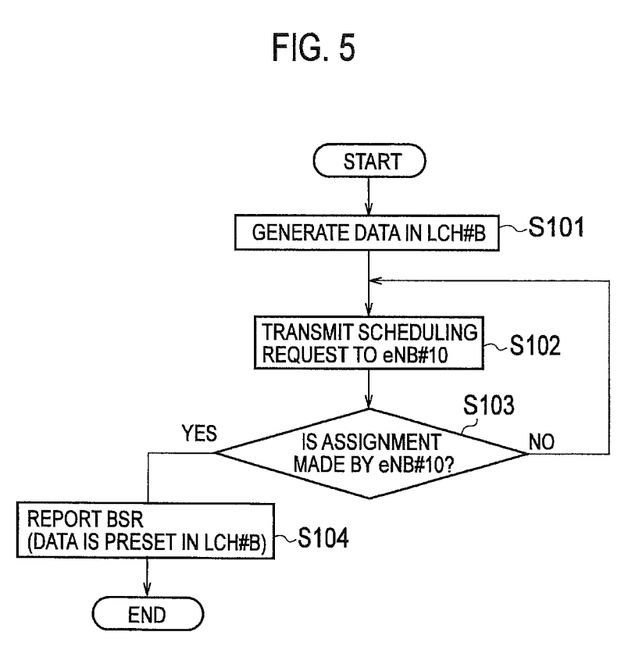
FIG. 5 is a flowchart illustrating operation of the mobile station according to Modification 1 of the present invention.

As illustrated in FIG. 5, the mobile station UE detects generation of uplink data to be transmitted in the bearer #B/LCH#B, in step S101. The mobile station UE then transmits a SR to the radio base station eNB#10 associated with the bearer #B/LCH#B (when the PUCCH-SR is assigned in the bearer #B/LCH#B) or starts the RA procedure with the radio base station eNB#10 (when the PUCCH-SR is not assigned in the bearer #B/LCH#B), in step S102.

In step 5103, when the mobile station UE receives a "UL grant" from the radio base station eNB#10 within a predetermined period, this operation proceeds to step S104. When the mobile station UE does not receive a "UL grant" from the radio base station eNB#10 within the predetermined period, this operation returns to step S102.

In step S104, the mobile station UE transmits a BSR reporting an amount of buffered data in the bearer #B/LCH#B to the radio base station eNB#10 by using a PUSCH corresponding to the "UL grant".

The features of the present embodiment may also be expressed as follows.

A first feature of the present embodiment is summarized as a mobile communication method in a mobile communication system in which a mobile station UE is configured to be capable of performing "Inter-site CA (carrier aggregation)" via a cell #1 (first cell) under a radio base station eNB#1 (first radio base station) and a cell #10 (second cell) under a radio base station eNB#10 (second radio base station), the mobile communication method including the steps of: when a bearer #A/LCH#A (first logical channel) is established between the mobile station UE and the radio base station eNB#1, a bearer #B/LCH#B (second logical channel) is established between the mobile station UE and the radio base station eNB#10, a PUCCH-SR (scheduling request transmission resource) is assigned to the mobile station UE by the radio base station eNB#1 associated with the bearer #A/LCH#A, and uplink data to be transmitted in the bearer #B/LCH#B is generated in the mobile station UE, causing the mobile station UE to transmit an SR (scheduling request) to the radio base station eNB#1 by using the PUCCH-SR; causing the radio base station eNB#1 to notify the mobile station UE of a "UL grant" for assignment of a PUSCH(buffered-data-amount transmission resource); causing the mobile station UE to transmit a BSR reporting an amount of buffered data in the bearer #B/LCH#B to the radio base station eNB#1 by using the PUSCH designated in the "UL grant"; causing the radio base station eNB#1 to notify the radio base station eNB#10 of the amount of buffered data in the bearer #B/LCH#B; and causing the radio base station eNB#10 to assign the mobile station UE a resource for transmission of the uplink data, upon receipt of the amount of buffered data.

According to this configuration, the radio base station eNB#10 and the radio base station eNB#1 can share the amount of buffered data in the bearer #B/LCH#B of the mobile station UE. Therefore, even if the mobile station UE transmits the BSR reporting the amount of buffered data in the bearer #B/LCH#B to the radio base station eNB#1 with which the bearer #B/LCH#B is not established, the radio base station eNB#10 can assign the mobile station UE the resource for transmission of the uplink data in the bearer #B/LCH#B.

A second feature of the present embodiment is summarized as a mobile communication method in a mobile communication system in which a mobile station UE is configured to be capable of performing "Inter-site CA" via a cell #1 under a radio base station eNB#1 and a cell #10 under a radio base station eNB#10, the mobile communication method including the steps of: when a bearer #A/LCH#A is established between the mobile station UE and the radio base station eNB#1, a bearer #B/LCH#B is established between the mobile station UE and the radio base station eNB#10, a PUCCH-SR is assigned to the mobile station UE by each of the radio base station eNB#1 associated with the bearer #A/LCH#A and the radio base station eNB#10 associated with the bearer #B/LCH#B, and uplink data to be transmitted in the bearer #B/LCH#B is generated in the mobile station UE, causing the mobile station UE to transmit an SR to the radio base station eNB#10 by using the PUCCH-SR assigned by the radio base station eNB#10, without transmitting the SR to the radio base station eNB#1 by using the PUCCH-SR assigned by the radio base station eNB#l; causing the radio base station eNB#10 to notify the mobile station UE of a "UL grant" ; causing the mobile station UE to transmit a BSR in the bearer #B/LCH#B to the radio base station eNB#10 by using the PUSCH designated in the "UL grant"; and causing the radio base station eNB#10 to assign the mobile station UE a resource for transmission of the uplink data, upon receipt of the BSR.

According to this configuration, the mobile station UE is configured to transmit the SR to the radio base station eNB#10 associated with the bearer #B/LCH#B, when the uplink data to be transmitted in the bearer #B/LCH#B is generated. In this case, even if the PUCCH-SR is assigned by the radio base station eNB#1 with which the bearer

A/LCH#A is established, the mobile station UE does not perform transmission of the SR by using the PUCCH-SR to the radio base station eNB#1 not associated with the bearer #B/LCH#B. Therefore, the radio base station eNB#10 can assign the mobile station UE the resource for transmission of the uplink data in the bearer #B/LCH#B.

A third feature of the present embodiment is summarized as a mobile communication method in a mobile communication system in which a mobile station UE is configured to be capable of performing "Inter-site CA" via a cell #1 under a radio base station eNB#1 and a cell #10 under a radio base station eNB#10, the mobile communication method including the steps of: when a bearer #A/LCH#A is established between the mobile station UE and the radio base station eNB#1, a bearer #B/LCH#B is established between the mobile station UE and the radio base station eNB#10, a PUCCH-SR is assigned to the mobile station UE by the radio base station eNB#1 associated with the bearer #A/LCH#A, a PUCCH-SR is not assigned to the mobile station UE by the radio base station eNB#10 associated with the bearer #B/LCH#B, and uplink data to be transmitted in the bearer #B/LCH#B is generated in the mobile station UE, causing the mobile station UE to start an RA procedure with the radio base station eNB#1, without transmitting an SR to the radio base station eNB#1 by using the PUCCH-SR assigned by the radio base station eNB#1; causing the radio base station eNB#10 to notify the mobile station UE of a "UL grant" in the RA procedure; causing the mobile station US to transmit a BSR in the bearer #B/LCH#B to the radio base station eNB#10 by using the PUSCH designated in the "UL grant"; and causing the radio base station eNB#10 to assign the mobile station UE a resource for transmission of the uplink data, upon receipt of the BSR.

According to this configuration, the mobile station UE is configured to transmit the SR to the radio base station eNB#10 associated with the bearer #B/LCH#B, when the uplink data to be transmitted in the bearer #B/LCH#B is generated. In this case, even if the PUCCH-SR is assigned by the radio base station eNB#1 with which the bearer #A/LCH#A is established, the mobile station UE does not perform transmission of the SR by using the PUCCH-SR to the radio base station eNB#1 not associated with the bearer #B/LCH#B. Therefore, the radio base station eNB#10 can assign the mobile station UE the resource for transmission of the uplink data in the bearer #B/LCH#B.

A fourth feature of the present embodiment is summarized as a mobile communication method in a mobile communication system in which a mobile station UE is configured to be capable of performing "Inter-site CA" via a cell #1 under a radio base station eNB#1 and a cell #10 under a radio base station eNB#10, the mobile communication method including the steps of: when a bearer #A/LCH#A is established between the mobile station UE and the radio base station eNB#1, a bearer #B/LCH#B is established between the mobile station UE and the radio base station eNB#10, the radio base station eNB#10 (or cell #10) is associated with the bearer #B/LCH#B, and uplink data to be transmitted in the bearer #B/LCH#B is generated in the mobile station UE, causing the mobile station UE to transmit a BSR in the bearer #B/LCH#B to the radio base station eNB#10 by using a PUSCH notified by the radio base station eNB#10, even though the PUCCH-SR is assigned by the radio base station eNB#1; and causing the radio base station eNB#10 to assign the mobile station UE a resource for transmission of the uplink data, upon receipt of the BSR.

According to this configuration, the mobile station UE is configured to transmit the BSR reporting an amount of buffered data in the bearer #B/LCH#B, to the radio base station eNB#10 associated with the bearer #B/LCH#B in which the generated uplink is to be transmitted. Therefore, the radio base station eNB#10 can assign the mobile station UE the resource for transmission of the uplink data in the bearer #B/LCH#B.

A fifth feature of the present embodiment is summarized as a radio base station eNB operable as a radio base station eNB#10 in a mobile communication system in which a mobile station UE is configured to be capable of performing "Inter-site CA" via a cell #1 under a radio base station eNB#1 and a cell #10 under the radio base station eNB#10, the radio base station eNB including: a reception unit 12 configured to, when a bearer #A/LCH#A is established between the mobile station UE and the radio base station eNB#1, a bearer #B/LCH#B is established between the mobile station UE and the radio base station eNB#10, a PUCCH-SR is assigned to the mobile station UE by the radio base station eNB#1, and uplink data to be transmitted in the bearer #B/LCH#B is generated in the mobile station UE, receive an amount of buffered data in the bearer #B/LCH#B from the radio base station eNB#1, after the mobile station UE transmits an SR to the radio base station eNB#1 by using the PUCCH-SR; and a transmission unit 13 configured to notify the mobile station UE of a resource for transmission of the uplink data, in response to receipt of the amount of buffered data.

A sixth feature of the present embodiment is summarized as a mobile station UE configured to be capable of performing "Inter-site CA" via a cell #1 under a radio base station eNB#1 and a cell #10 under a radio base station eNB#10. Here, the mobile station UE is configured to: even when a bearer #A/LCH#A is established with the radio base station eNB#1, a bearer #B/LCH#B is established with the radio base station eNB#10, a PUCCH-SR is assigned to the mobile station UE by each of the radio base station eNB#1 and the radio base station eNB#10, and uplink data to be transmitted in the bearer #B/LCH#B is generated, transmit an SR to the radio base station eNB#10 by using the PUCCH-SR assigned by the radio base station eNB#10 without transmitting an SR to the radio base station eNB#1 by using the PUCCH-SR assigned by the radio base station eNB#1; and transmit a BSR in the bearer #B/LCH#B to the radio base station eNB#10 by using a PUSCH notified by the radio base station eNB#10.

A seventh feature of the present embodiment is summarized as a mobile station UE configured to be capable of performing "Inter-site CA" via a cell #1 under a radio base station eNB#1 and a cell #10 under a radio base station eNB#10. Here, the mobile station UE is configured to: even when a bearer #A/LCH#A is established with the radio base station eNB#1, a bearer #B/LCH#B is established with the radio base station eNB#10, a PUCCH-SR is assigned to the mobile station UE by the radio base station eNB#1, a PUCCH-SR is not assigned to the mobile station UE by the radio base station eNB#10, and uplink data to be transmitted in the bearer #B/LCH#B is generated, start an RA procedure with the radio base station eNB#10 without transmitting an SR to the radio base station eNB#1 by using the PUCCH-SR assigned by the radio base station eNB#1; and transmit a BSR in the bearer #B/LCH#B to the radio base station eNB#10 by using a PUSCH notified by the radio base station eNB#10 in the RA procedure.

An eighth feature of the present embodiment is summarized as a mobile station UE configured to be capable of performing "Inter-site CA" via a cell #1 under a radio base station eNB#1 and a cell #10 under a radio base station eNB#10. Here, the mobile station UE is configured to, when a bearer #A/LCH#A is established with the radio base station eNB#1, a bearer #B/LCH#B is established with the radio base station eNB#10, a PUCCH-SR is assigned to the mobile station UE by the radio base station eNB#10, the radio base station eNB#1 (or the cell #1) is associated with the bearer #B/LCH#B, and uplink data to be transmitted in the bearer #B/LCH#B is generated, transmit an SR to the radio base station eNB#10 by using the PUCCH-SR, and transmit a BSR in the bearer #B/LCH#B to the radio base station eNB#10 by using a PUSCH notified by the radio base station eNB#10.

A ninth feature of the present embodiment is summarized as a mobile station UE configured to be capable of performing "Inter-site CA" via a cell #1 under a radio base station eNB#1 and a cell #10 under a radio base station eNB#10. Here, the mobile station UE is configured to: when a bearer #A/LCH#A is established with the radio base station eNB#1, a bearer #B/LCH#B is established with the radio base station eNB#10, the radio base station eNB#10 (cell #10) is associated with the bearer #B/LCH#B, and uplink data to be transmitted in the bearer #B/LCH#B is generated, and even if a PUCCH-SR is assigned to the mobile station UE by the radio base station eNB#1, transmit an SR to the radio base station eNB#10 by using the PUCCH-SR assigned by the radio base station eNB#10 without transmitting an SR to the radio base station eNB#1 by using the PUCCH-SR assigned by the radio base station eNB#1, or start an RA procedure with the radio base station eNB#10; and when a resource is not assigned to the mobile station UE by the radio base station eNB#10 for a predetermined period, transmit an SR to the radio base station eNB#1 by using the PUCCH-SR assigned by the radio base station eNB#1, or start an RA procedure with the radio base station eNB#1.

A tenth feature of the present embodiment is summarized as a radio base station eNB operable as a radio base station eNB#1 in a mobile communication system in which a mobile station UE is configured to be capable of performing "Inter-site CA" via a cell #1 under the radio base station eNB#1 and a cell #10 under a radio base station eNB#10. Here, the radio base station eNB is configured to, when a bearer #A/LCH#A is established between the mobile station UE and the radio base station eNB#1, a bearer #B/LCH#B is established between the mobile station UE and the radio base station eNB#10, a PUCCH-SR is assigned to the mobile station UE by the radio base station eNB#1, and uplink data to be transmitted in the bearer #B/LCH#B is generated in the mobile station UE, notify the mobile station UE of a "UL grant" after receiving an SR from the mobile station UE by using the PUSCH-SR; and when receiving an amount of buffered data in the bearer #B/LCH#B by using the PUSCH designated in the "UL grant", notify the radio base station eNB#10 of the amount of buffered data.

Note that the association of the bearer with the radio base station (or the cell) may be notified by an RRC layer, or may be notified by any of layers such as a PDCP layer, and a RLC layer, an MAC layer, and a physical layer.

Here, the foregoing operations of the mobile stations UE and the radio base stations eNB#1 and #10 may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile stations UE and the radio base stations eNB#1 and #10. Otherwise, the storage medium and the processor may be provided as discrete components inside the mobile stations UE and the radio base stations eNB#1 and #10.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-195289 (filed on Sep. 5, 2012) is incorporated by reference in the present specification.

INDUSTRIAL APPLICABILITY

As described above, according to the present invention, it is possible to provide a mobile communication method, a radio base station, and a mobile station, which are capable of avoiding occurrence of a delay in transmission of uplink data when "Inter-site CA" is performed.

EXPLANATION OF THE REFERENCE NUMERALS eNB#1, eNB#10 radio base station
UE mobile station
11, 23 reception unit
12, 22 transmission unit
21 management unit

The invention claimed is:
1. A mobile communication method in a mobile communication system in which a mobile station is configured to be capable of performing carrier aggregation via a first cell under a first radio base station and a second cell under a second radio base station, the mobile communication method including the steps of:
when a first logical channel is established between the mobile station and the first radio base station, a second logical channel is established between the mobile station and the second radio base station, a scheduling request transmission resource is assigned to the mobile station by each of the first radio base station and the second radio base station, and uplink data to be transmitted in the second logical channel is generated in the mobile station,
causing the mobile station to transmit a scheduling request to the second radio base station by using the scheduling request transmission resource assigned by the second radio base station, without transmitting the scheduling request to the first radio base station by using the scheduling request transmission resource assigned by the first radio base station;

causing the second radio base station to notify, the mobile station of a buffered-data-amount transmission resource;

causing the mobile station to transmit an amount of buffered data in the second logical channel to the second radio base station by using the buffered-data-amount transmission resource; and causing the second radio base station to assign the mobile station a resource for transmission of the uplink data, upon receipt of the amount of buffered data, wherein the amount of buffered data is a total amount of buffered data for the second logical channel, associated with the second radio base station, among a plurality of logical channels which belong to a plurality of logical channel groups.

2. A mobile communication method in a mobile communication system in which a mobile station is configured to be capable of performing carrier aggregation via a first cell under a first radio base station and a second cell under a second radio base station, the mobile communication method including the steps of:

when a first logical channel is established between the mobile station and the first radio base station, a second logical channel is established between the mobile station and the second radio base station, a scheduling request transmission resource is assigned to the mobile station by the first radio base station, a scheduling request transmission resource is not assigned to the mobile station by the second radio base station, and uplink data to be transmitted in the second logical channel is generated in the mobile station, causing the mobile station to start a random access procedure with the second radio base station, without transmitting a scheduling request to the first radio base station by using the scheduling request transmission resource assigned by the first radio base station;

causing the second radio base station to notify the mobile station of a buffered-data-amount transmission resource in the random access procedure;

causing the mobile station to transmit an amount of buffered data in the second logical channel to the second radio base station by using the buffered-data-amount transmission resource; and causing the second radio base station to assign the mobile station a resource for transmission of the uplink data, upon receipt of the amount of buffered data, wherein the amount of buffered data is a total amount of buffered data for the second logical channel, associated with the second radio base station, among a plurality of logical channels which belong to a plurality of logical channel groups.

3. A mobile communication method in a mobile communication system in which a mobile station is configured to be capable of performing carrier aggregation via a first cell under a first radio base station and a second cell under a second radio base station, the mobile communication method including the steps of:

when a first logical channel is established between the mobile station and the first radio base station, a second logical channel is established between the mobile station and the second radio base station, a scheduling request transmission resource is assigned to the mobile station by the first radio base station, and uplink data to be transmitted in the second logical channel is generated in the mobile station, causing the mobile station to transmit an amount of buffered data in the second logical channel to the second radio base station by using a buffered-data-amount transmission resource notified by the second radio base station, even though the scheduling request transmission resource is assigned by the first radio base station; and causing the second radio base station to assign the mobile station a resource for transmission of the uplink data, upon receipt of the amount of buffered data, wherein the amount of buffered data is a total amount of buffered data for the second logical channel, associated with the second radio base station, among a plurality of logical channels which belong to a plurality of logical channel groups.

4. A mobile station configured to be capable of performing carrier aggregation via a first cell under a first radio base station and a second cell under a second radio base station, wherein the mobile station is configured to:

even when a first logical channel is established with the first radio base station, a second logical channel is established with the second radio base station, a scheduling request transmission resource is assigned to the mobile station by the first radio base station, a scheduling request transmission resource is not assigned to the mobile station by the second radio base station, and uplink data to be transmitted in the second logical channel is generated, start a random access procedure with the second radio base station without transmitting a scheduling request to the first radio base station by using the scheduling request transmission resource assigned by the first radio base station; and transmit an amount of buffered data in the second logical channel to the second radio base station by using a buffered-data-amount transmission resource notified by the second radio base station in the random access procedure, wherein the amount of buffered data is a total amount of buffered data for the second logical channel, associated with the second radio base station, among a plurality of logical channels which belong to a plurality of logical channel groups.

5. A mobile station configured to be capable of performing carrier aggregation via a first cell under a first radio base station and a second cell under a second radio base station, wherein the mobile station is configured to when a first logical channel is established with the first radio base station, a second logical channel is established with the second radio base station, a scheduling request transmission resource is assigned to the mobile station by each of the first radio base station and the second radio base station, and uplink data to he transmitted in the second logical channel is generated, transmit a scheduling request to the second radio base station by using the scheduling request transmission resource assigned by the second radio base station without transmitting a scheduling request to the first radio base station by using the scheduling request transmission resource assigned by the first radio base station; and transmit an amount of buffered data in the second logical channel to the second radio base station by using a buffered-data-amount transmission resource notified by the second radio base station, wherein the amount of buffered data is a total amount of buffered data for the second logical channel, associated with the second radio base station, among a plurality of logical channels which belong to a plurality of logical channel groups.

6. A mobile station configured to be capable of performing carrier aggregation via a first cell under a first radio base station and a second cell under a second radio base station, wherein the mobile station is configured to, when a first logical channel is established with the first radio base station, a second logical channel is established with the second radio base station, the second radio base station is associated with the second logical channel, and uplink data to be transmitted in the second logical channel is generated, transmit an amount of buffered data in the second logical channel to the second radio base station by using a buffered-data-amount transmission resource notified by the second radio base station even if a scheduling request transmission resource is assigned by the first radio base station, wherein the amount of buffered data is a total amount of buffered data for the second logical channel, associated with the second radio base station, among a plurality of logical channels which belong to a plurality of logical channel groups.

* * * * *